INVENTOR.
J. P. LINDSEY
BY Hudson & Young
ATTORNEYS

INVENTOR.
J. P. LINDSEY
BY Hudson & Young
ATTORNEYS

INVENTOR.
J.P. LINDSEY
BY Hudson & Young
ATTORNEYS

July 28, 1959  J. P. LINDSEY  2,897,477
SIGNAL COHERENCE MEASUREMENT
Filed April 18, 1958  7 Sheets-Sheet 4

INVENTOR.
J. P. LINDSEY
BY Hudson + Young
ATTORNEYS

July 28, 1959  J. P. LINDSEY  2,897,477
SIGNAL COHERENCE MEASUREMENT
Filed April 18, 1958  7 Sheets-Sheet 5

INVENTOR.
J. P. LINDSEY
BY Hudson & Young
ATTORNEYS

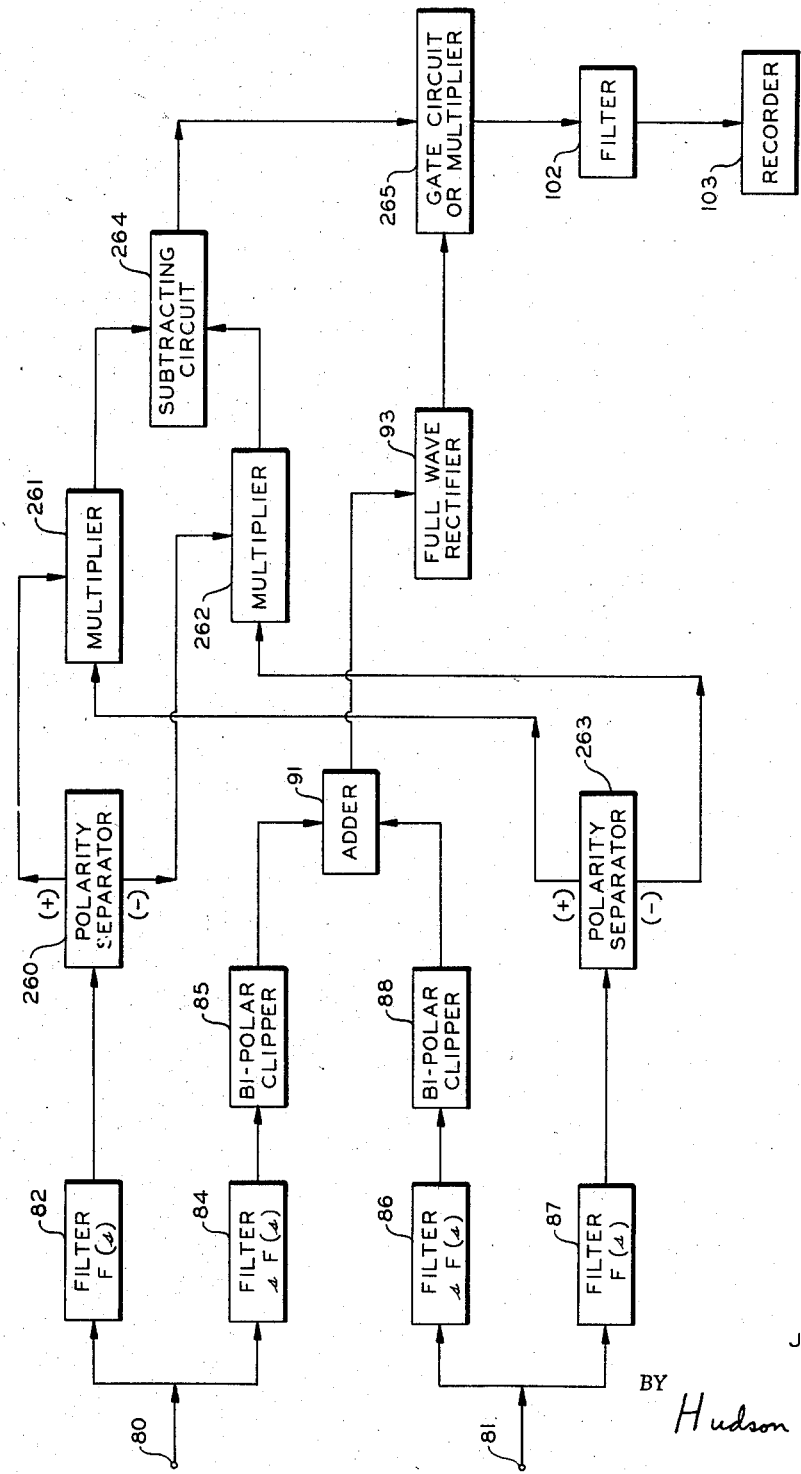

United States Patent Office 2,897,477
Patented July 28, 1959

2,897,477

SIGNAL COHERENCE MEASUREMENT

Joe P. Lindsey, Bartlesville, Okla., assignor to Phillips Petroleum Company, a corporation of Delaware Application April 18, 1958, Serial No. 729,300

14 Claims. (Cl. 340—15)

This invention relates to the determination of coherence between electrical signals.

Seismic exploration refers to a method of obtaining information regarding subterranean earth formations by transmitting vibrations from a first point at or near the surface of the earth downwardly into the formations and measuring the reflected or refracted vibrations at one or more second points spaced from the first point. It is common practice to detonate an explosive charge to produce the vibrations. A plurality of seismometers are disposed in a predetermined geometric array in spaced relationship from the shot holes. The vibrations incident upon the seismometers are converted into corresponding electrical signals which are amplified and recorded. By noting the relative arrival times of selected reflected vibrations in a plurality of records, it is possible to obtain valuable information regarding the depth and slope of subterranean reflecting beds. However, extraneous vibrations usually are present in the recorded records which tend to obscure the recognition of the desired reflected signals. In order to minimize these extraneous vibrations, a number of systems have been proposed which include electrical tuning networks and the combination of signals received from a plurality of seismometers. However, there are still large areas where it is impossible to obtain accurate information by seismic exploration because of the noise vibrations.

The present invention provides an improved method of seismic exploration wherein the records are transformed in a manner so that common reflections in a plurality of signals are readily identifiable. This is accomplished by measuring the coherence between two electrical signals. The two signals to be compared are combined when they correspond to one another and an output signal is provided which represents common portions of the two signals. The output signal is a maximum when both the polarities of the input signals and the derivatives of the input signals are the same. The result of this double criterion is that only components of the two input signals which are within 90° of one another in phase are present in the output. Apparatus is provided for obtaining the derivatives of both of the signals to be compared. Gate circuits and multiplying circuits are provided so that the original signals are combined with one another only at such times as the polarities and phase relationships of the two input signals are substantially equal. It has been found that seismic signals transformed in accordance with the procedure of this invention provide a record which permits identification of desired reflections even in the presence of a large amount of random noise vibrations.

Accordingly, it is an object of this invention to provide apparatus for transforming seismic signals so that reflections from common subterranean formations are readily identifiable in a plurality of records.

Another object is to provide an improved system for measuring coherence between two electrical signals.

A further object is to provide a system of seismic exploration which permits reflected vibrations to be identified in the presence of random noise vibrations.

Other objects, advantages and features of this invention should become apparent from the following detailed description which is taken in conjunction with the accompanying drawings in which:

Figure 8 is a schematic block diagram of a fourth embodiment of the coherence measuring apparatus.

Figure 1:
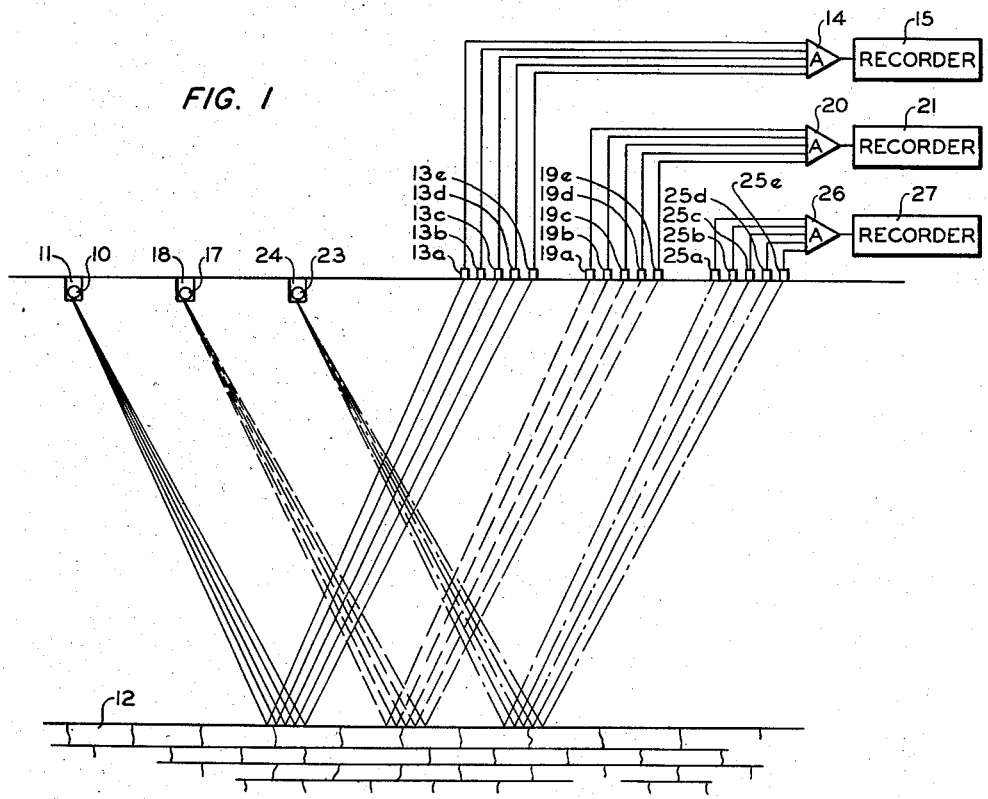
Figure 1 is a schematic representation of a seismic exploration procedure which can be employed to carry out the method of this invention.

Referring now to the drawing in detail and to Figure 1 in particular, there is shown a seismic exploration system. A first explosive charge 10 is detonated in a shot hole 11. Vibrations emitted from this explosive charge are reflected from a subterranean formation 12 and are received by a plurality of seismometers 13a, 13b, 13c, 13d, and 13e which are spaced from one another and from shot hole 11. The output signals from these five seismometers are combined by a summing amplifier 14 and applied to a recorder 15. A second explosive charge 17 is subsequently detonated in a shot hole 18 which is spaced from shot hole 11. Vibrations emitted from explosive charge 17 are reflected by formation 12 and received by a plurality of second seismometers 19a, 19b, 19c, 19d, and 19e which are spaced from shot hole 18 and from the first set of seismometers. The signals received by this second group of seismometers are combined by summing amplifier 20 and applied to a recorder 21. A third explosive charge 23 is then detonated in a shot hole 24 which is spaced from shot hole 18. The vibrations emitted from this explosive charge are reflected from the formation 12 and received at a plurality of third seismometers 25a, 25b, 25c, 25d, and 25e which are spaced from shot hole 24 and from the second group of seismometers. The signals received by this third group of seismometers are combined by a summing amplifier 26 and applied to a recorder 27.

In the method illustrated in Figure 1, it is desirable that the shot holes be spaced equidistant from one another along a common line. The groups of seismometers are similarly spaced from one another along the same line. This procedure simplifies the record combining processes of this invention, but is not essential, as is pointed out hereinafter in detail. The procedure described in conjunction with Figure 1 is repeated with explosive charges being detonated in sequence in a series of shot holes spaced from shot hole 24. This invention will be described in conjunction with only three explosive charges in order to simplify the explanation and the drawing. However, in actual practice, a larger number of signals normally are obtained and combined.

Figure 2:
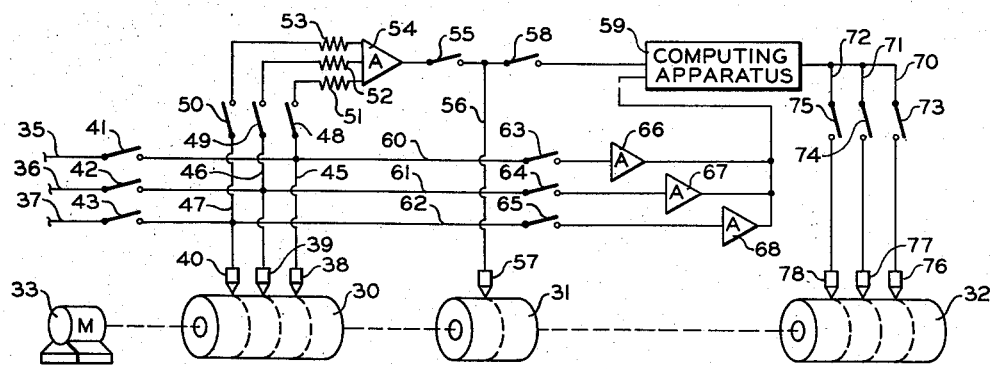
Figure 2 is a schematic view of the recording and computing apparatus which can be employed to carry out this invention.

The recording and computing apparatus of this invention is illustrated schematically in Figure 2. It is desirable that the seismic signals be recorded initially on a magnetic tape because such a procedure enables the records to be manipulated readily. The recording apparatus of Figure 2 comprises drums 30, 31, and 32 which have magnetic tapes thereon and which are rotated by a motor 33. Although separate drums have been shown in the drawing, it should be evident that a single drum with a larger number of channels can be employed. The output signals from amplifiers 14, 20, and 26 of Figure 1 are connected by conductors 35, 36, and 37, respectively, to respective recording heads 38, 39, and 40 adjacent drum 30. Conductors 35, 36, and 37 have switches 41, 42, and 43, respectively, therein. The output signals of the three summing amplifiers are thus recorded initially on drum 30. In order to simplify the drawings, single conductors are illustrated. It should be evident that two conductors, or one conductor and ground, actually are employed.

In accordance with a present preferred embodiment of this invention, it is desired that these three signals be summed to provide a composite record. Recording heads 38, 39, and 40 are connected by respective conductors 45, 46, and 47, which have respective switches 48, 49, and 50 therein, through respective isolating resistors 51, 52, and 53 to the inputs of a summing amplifier 54. The output of amplifier 54 is connected through a switch 55 and a conductor 56 to a recording head 57 adjacent drum 31. After the initial signals are recorded on drum 30, switches 41, 42 and 43 are opened and switches 48, 49 and 50 are closed. Drum 30 is rotated past heads 38, 39, and 40 which then function as reproducing heads so that the initial recorded signals are summed and recorded on drum 31. Switch 55 is closed at this time. The signal recorded on drum 31 is then combined with the individual signals originally recorded on drum 30 in accordance with the procedure of this invention. Head 57 of drum 31 is connected through conductor 56 and a switch 58 to the first input terminal of computing apparatus 59. Heads 38, 39, and 40 of drum 30 are connected by respective conductors 60, 61, and 62, which have respective switches 63, 64, and 65 therein, to the inputs of amplifiers 66, 67, and 68 respectively. The outputs of these amplifiers are connected to the second input of computing apparatus 59. The output of computing apparatus 59 is connected by conductors 70, 71, and 72, which have respective switches 73, 74, and 75 therein, to respective recording heads 76, 77, and 78 of drum 32.

Figure 3:
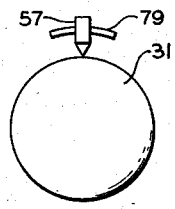
Figure 3 is an end view of one of the recording drums of Figure 2.

The recording heads of drums 30 and 31 are adjustably mounted so that the signals originally recorded can be reproduced with selected time delays. This is illustrated schematically in Figure 3 where recording head 57 is shown attached to a curved support member 79 adjacent drum 31.

Figure 4:
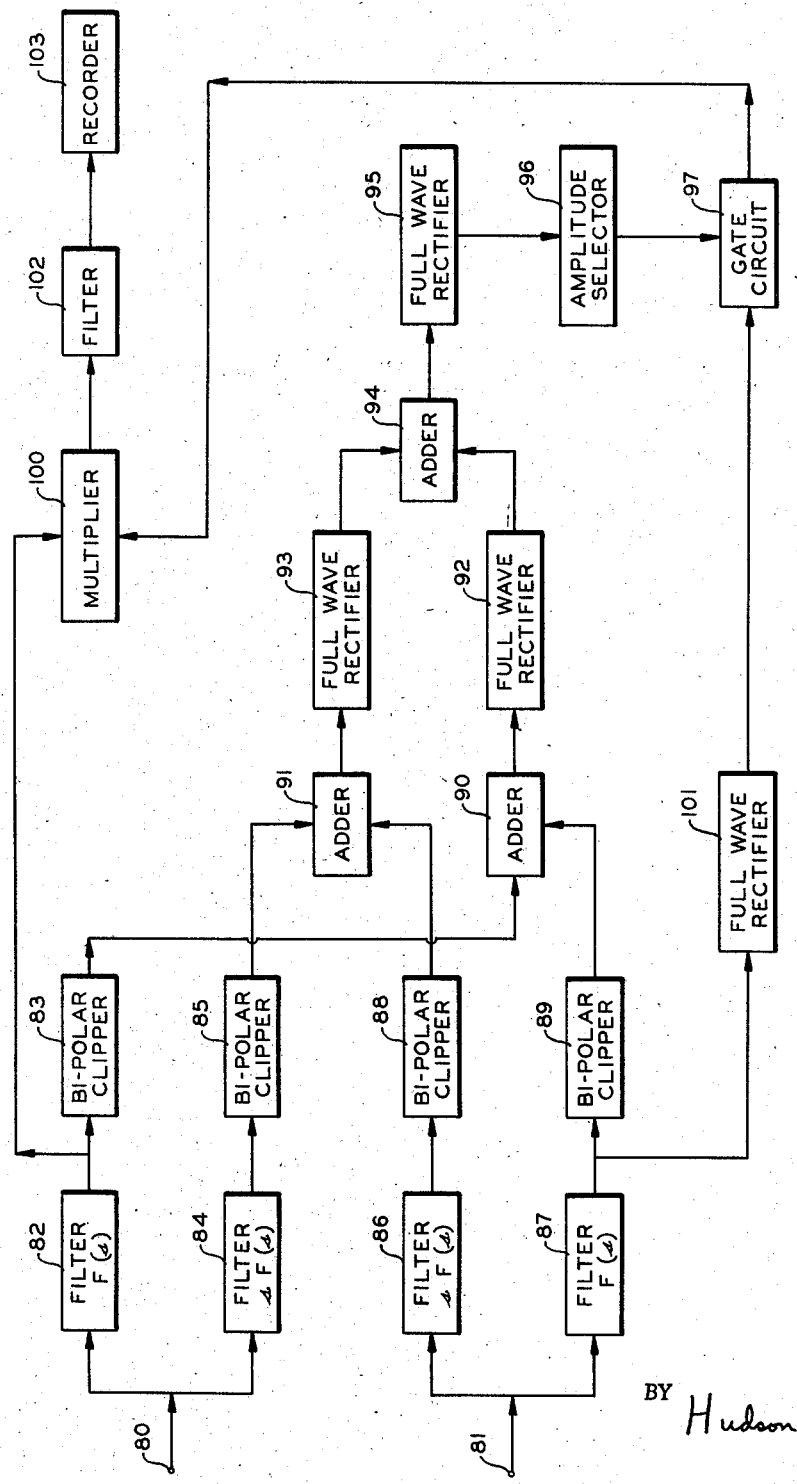
Figure 4 is a schematic block diagram of a first embodiment of the coherence measuring circuit of this invention.

In a preferred embodiment of this invention, one of the original seismic signals is compared with a second signal represented by the sum of a plurality of the original signals. The second of these signals can represent the signal originally recorded on drum 31, for example. The first of these signals can represent the signal originally recorded by head 38 on drum 30, for example. However, one signal can also be compared directly with another signal to obtain useful information. With reference to Figure 4, one of the signals to be compared is applied to an input terminal 80 and the other is applied to an input terminal 81. The signal applied to terminal 80 is transmitted through a filter 82 to the input of a bi-polar clipper 83 and through a second filter 84 to the input of a second bi-polar clipper 85. Filter 82 is a conventional low-pass filter which transmits signals corresponding to the seismic signals of interest, 100 cycles per second and lower, for example, but blocks high frequency signals. Filter 82 is designed so that the desired seismic signals are not changed appreciably in either phase or wave form. Filter 84 is similar to filter 82 except that it forms the derivative of the transmitted signal. Suitable amplification is incorporated in the filter and clipper circuits so that the output signals from the clippers are substantially square waves. The input signal applied to terminal 81 is transmitted through filters 86 and 87 to the inputs of respective clippers 88 and 89. Filters 86 and 87 and clippers 88 and 89 correspond generally to filters 82 and 84 and clippers 83 and 85, respectively. The output signals from clippers 83 and 89 are applied to the inputs of an adder 90, and the output signals from clippers 85 and 88 are applied to the inputs of an adder 91. The output signals of adders 90 and 91 are applied through respective full wave rectifiers 92 and 93 to the inputs of a third adder 94. The output signal of adder 94 is applied through a full wave rectifier 95 to an amplitude selector 96, the output of which controls a gate circuit 97. The output signal from filter 82 is also applied to the first input of a multiplier 100. The output signal of filter 87 is applied through a full wave rectifier 101 and gate circuit 97 to the second input of multiplier 100. The output signal of multiplier 100 is applied through a filter 102 to a recorder 103.

The apparatus of Figure 4 is operated so that one of the filtered input signals is multiplied by the absolute value of the filtered second signal when there is coherence between both the amplitudes and phases of the original signals. Gate circuit 97 is open only when this coherence exists. When the polarities of the original signals are the same, the output of adder 90 is a maximum. When the derivatives of the original signals are of the same polarity, the output of adding circuit 91 is a maximum. Amplitude selector 96 is adjusted so that gate 97 is open only when the sum of the output signals from adders 90 and 91 exceeds a predetermined value. Thus, the output signal emphasizes common vibration patterns in the original signals, while random noise vibrations are substantially eliminated.

Figure 5:
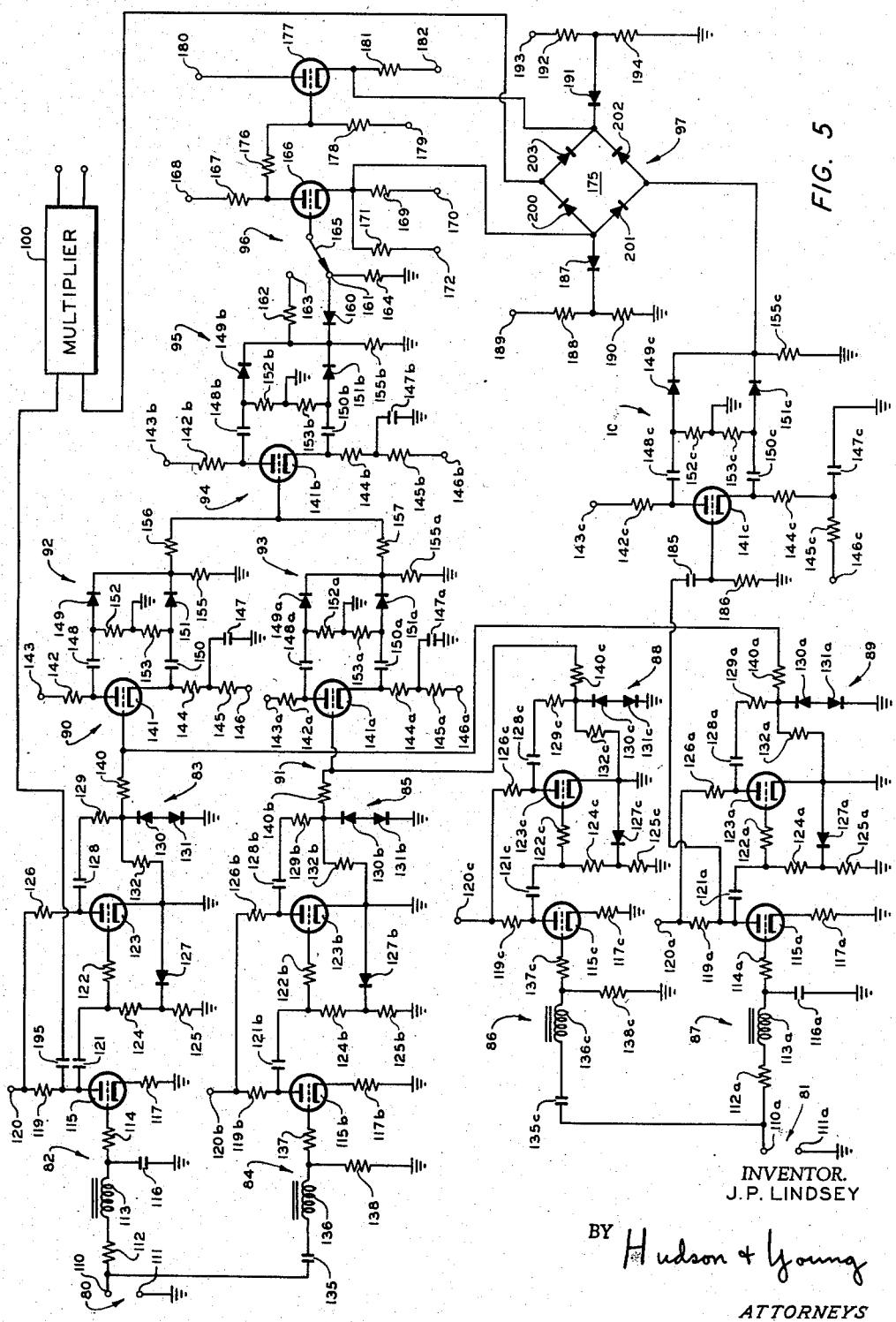
Figure 5 is a schematic circuit drawing of the apparatus of Figure 4.

A schematic circuit drawing of the apparatus illustrated schematically in Figure 4 is shown in Figure 5. The first input signal is applied between terminals 110 and 111, the latter being grounded. Terminal 110 is connected through a resistor 112, an inductor 113 and a resistor 114 to the control grid of a triode 115. The junction between inductor 113 and resistor 114 is connected to ground through a capacitor 116. The cathode of triode 115 is connected to ground through a resistor 117, and the anode of triode 115 is connected through a resistor 119 to a positive potential terminal 120. The anode of triode 115 is also connected through a capacitor 121 and a resistor 122 to the control grid of a second triode 123. The junction between capacitor 121 and resistor 122 is connected to ground through resistors 124 and 125. The anode of triode 123 is connected through a resistor 126 to terminal 120, and the cathode of triode 123 is connected directly to ground. A rectifier 127 is connected between ground and the junction between resistors 124 and 125. The anode of triode 123 is connected through a capacitor 128 to the first terminal of a resistor 129. The second terminal of resistor 129 is connected to ground through rectifiers 130 and 131 which are connected in series relationship, but of opposite polarity. A resistor 132 is connected between the second terminal of resistor 129 and ground.

The circuit thus far described constitutes filter 82 and clipper 83 of Figure 4. It should be evident that resistor 112, inductor 113 and capacitor 116 form a low-pass filter. The filtered signal is amplified by triodes 115 and 123. The output signal from triode 123 is clipped by rectifiers 130 and 131 which can advantageously be silicon diodes. Silicon is a semi-conducting material so that the diodes have high resistance to the passage of current in one direction and low resistance to passage of current in the opposite direction. When the reverse voltage across such a diode exceeds a predetermined value, the diode becomes conductive in the reverse direction and substantially a constant voltage drop occurs across the diode. This permits the input signal to be clipped with regard to both polarities.

Filter 87 and clipper 89 are identical to filter 82 and clipper 83, respectively, and corresponding elements are designated by corresponding $a$ reference numerals in Figure 5.

Input terminal 110 is also connected through a capacitor 135, an inductor 136 and a resistor 137 to the control grid of a triode 115b. The junction between inductor 136 and resistor 137 is connected to ground through a resistor 138. This circuit thus constitutes filter 83 of Figure 4 which provides an output signal that is a derivative of the input signal. The circuit of clipper 85 corresponds to the elements described in conjunction with clipper 83, and like elements are designated by corresponding $b$ reference numerals.

Filter 86 and clipper 88 are identical to filter 84 and clipper 85, respectively, and corresponding elements are designated by corresponding $c$ reference numerals in Figure 5.

The second terminals of resistors 129 and 129a are connected through respective isolating resistors 140 and 140a to the control grid of a triode 141. The anode of triode 141 is connected through a resistor 142 to a positive potential terminal 143, and the cathode of triode 141 is connected through resistors 144 and 145 to a negative potential terminal 146. The junction between resistors 144 and 145 is connected to ground through a capacitor 147. The anode of triode 141 is connected through a capacitor 148 to the first terminal of a rectifier 149, and the cathode of triode 141 is connected through a capacitor 150 to the first terminal of a rectifier 151. The junction between capacitor 148 and rectifier 149 is connected to ground through a resistor 152, and the junction between capacitor 150 and rectifier 151 is connected to ground through a resistor 153. The second terminals of rectifiers 149 and 151 are connected to ground through a resistor 155.

The circuit associated with triode 141 comprises adder 90 and full wave rectifier 92 of Figure 4. The two signals applied to the control grid of triode 141 are summed, and the two outputs from triode 141 are rectified. Adder 91 and full wave rectifier 93 are identical to adder 90 and rectifier 92, respectively, and corresponding elements are designated by like $a$ reference numerals.

The second terminals of rectifiers 149 and 151 are connected through an isolating resistor 156 to the control grid of a triode 141b. The second terminals of rectifiers 149a and 151a are connected through an isolating resistor 157 to the control grid of triode 141b. Adder 94 and rectifier 95 are also identical to adder 90 and rectifier 92, respectively, and corresponding elements are designated by like $b$ reference numerals.

The second terminals of rectifiers 149b and 151b are connected through a rectifier 160 of opposite polarity to a terminal 161. The second terminals of rectifiers 149b and 151b are also connected through a resistor 162 to a terminal 163. Terminals 161 and 163 are adapted to be engaged selectively by a switch 165 which is connected to the control grid of a triode 166. The anode of triode 166 is connected through a resistor 167 to a positive potential terminal 168. The cathode of triode 166 is connected through a resistor 169 to a negative potential terminal 170 and through a resistor 171 to a positive potential terminal 172. The cathode of triode 166 is also connected to the junction between rectifiers 200 and 201 of a full wave rectifier bridge network 175. The anode of triode 166 is connected through a resistor 176 to the control grid of a triode 177. The control grid of triode 177 is connected through a resistor 178 to a negative potential terminal 179. The anode of triode 177 is connected directly to a positive potential terminal 180, and the cathode of triode 177 is connected through a resistor 181 to a negative potential terminal 182. The cathode of triode 177 is also connected to the junction between rectifiers 202 and 203 of network 175.

The position of switch 165 determines the sensitivity of the coherence measurement. Triodes 166 and 177 serve to control gate circuit 97 by adjusting the potential applied across first opposite terminals of rectifier bridge network 175. Unless the input signal applied to the control grid of triode 166 exceeds a predetermined value, the gate circuit remains closed so that the output signal from rectifier 101 of Figure 4 is not applied to multiplier 100.

The anode of triode 115a is connected through a capacitor 185 to the control grid of a triode 141c. The control grid of triode 141c is connected to ground through a resistor 186. The output circuit of triode 141 constitutes rectifier 101 and is identical to the circuit associated with triode 141, corresponding elements being designated by like $c$ reference numerals. The output signal of rectifier 101 is applied to the junction between rectifiers 201 and 202 of network 175. The junction between rectifiers 200 and 201 is connected through a rectifier 187 and a resistor 188 to a negative potential terminal 189. The junction between rectifier 187 and resistor 188 is connected to ground through a resistor 190. The junction between rectifiers 202 and 203 is connected through a rectifier 191 and a resistor 192 to a positive potential terminal 193. The junction between rectifier 191 and resistor 192 is connected to ground through a resistor 194. The junction between rectifiers 200 and 203 is connected to one of the input terminals of multiplier 100. The anode of triode 115 is connected through a capacitor 195 to the second input terminal of multiplier 100. Multiplier 100 can be of the type described in Electronics, August 1956, page 182, for example. The output signal from multiplier 100 is applied through filter 102 of Figure 4 to recorder 103. Filter 102 is employed to provide a smooth output signal. A suitable circuit for this purpose is described in my copending application, Serial No. 649,449, filed March 29, 1957.

As a specific example of the operation of this invention, the circuit components of Figure 5 had the values set forth in the following table. All resistances are expressed in ohms, capacitances in microfarads, inductances in henries and voltages in volts. All $a$, $b$, and $c$ elements had the same value as the corresponding element designated by the numeral alone.

| Element: | Value |
| --- | --- |
| 112 | 430,000 |
| 114 | 2,000,000 |
| 117 | 750 |
| 119 | 100,000 |
| 124 | 510,000 |
| 125 | 1,100,000 |
| 122 | 2,000,000 |
| 129 | 100,000 |
| 132 | 1,000,000 |
| 138 | 430,000 |
| 140 | 1,000,000 |
| 142 | 100,000 |
| 144 | 100,000 |
| 145 | 180,000 |
| 152 | 510,000 |
| 153 | 510,000 |
| 155 | 1,000,000 |
| 156 | 1,000,000 |
| 157 | 1,000,000 |
| 162 | 1,000,000 |
| 164 | 1,000,000 |
| 167 | 75,000 |
| 176 | 300,000 |
| 171 | 180,000 |
| 169 | 62,000 |
| 178 | 1,300,000 |
| 181 | 62,000 |
| 188 | 300,000 |
| 190 | 2,000 |
| 192 | 300,000 |
| 194 | 2,000 |
| 116 | 0.005 |

| Element: | Value |
|---|---|
| 121 | 0.2 |
| 195 | 0.2 |
| 128 | 1.0 |
| 148 | 2.0 |
| 150 | 2.0 |
| 147 | 10.0 |
| 113 | 500 |
| 136 | 500 |
| 120 | 300 |
| 143 | 300 |
| 146 | —300 |
| 168 | 300 |
| 170 | —300 |
| 172 | 300 |
| 179 | —300 |
| 180 | 300 |
| 182 | —300 |
| 189 | —300 |
| 193 | 300 |

| Tube: | Type |
|---|---|
| 115 and 123 | 12AX7 |
| 141 and 141a | 12AX7 |
| 166 and 177 | 12AU7 |

All rectifiers were type TI 600 except 130, 131, 130a, 131a, 130b, 131b, 130c and 131c which were type TI 604.

Figure 6:
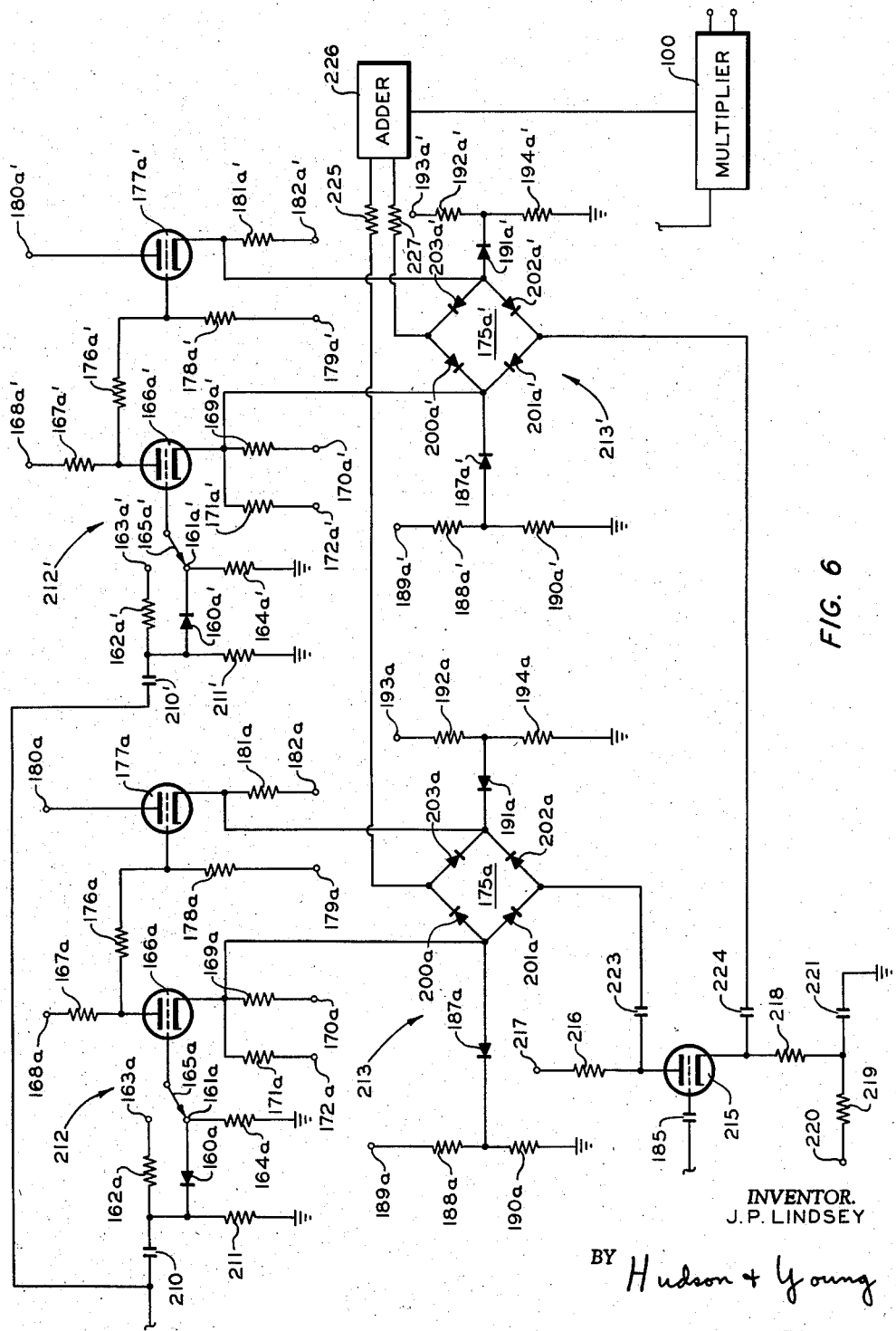
Figure 6 is a schematic circuit drawing of a second embodiment of the coherence measuring apparatus.

In Figure 6 there is shown a second embodiment of the coherence measuring apparatus of this invention. The input part of the apparatus of Figure 6, not shown, is identical to that of Figures 4 and 5 with respect to filters 82, 84, 86 and 87, clippers 83, 85, 88 and 89, adders 90 and 91, rectifiers 92 and 93 and adder 94. The corresponding anode of triode 141b of Figure 5 is connected through a capacitor 210 to the first terminals of a resistor 162a and a rectifier 160a. The first terminals of these elements are connected to ground through a resistor 211. Resistor 162a and rectifier 160a form the input of a positive threshold device 212 which is identical to amplitude selector 96 of Figure 4. The elements of this amplitude selector are identified by a reference numerals which correspond to those of selector 96. This positive threshold device controls a gate circuit 213 which is identical to gate circuit 97 of Figure 4. The corresponding anode of triode 141b of Figure 5 is also connected through a capacitor 210' to the input of a negative threshold circuit 212' which is similar in many respects to positive threshold circuit 212. The negative threshold differs from the positive threshold circuit in that rectifiers 160a', 187a', 191a', 200a', 201a', 202a' and 203a' are reversed. Terminal 193a' is maintained at a negative potential and terminal 189a' is maintained at a positive potential.

The output signal from corersponding filter 87 of Figure 4 is applied through a capacitor 185 to the control grid of a triode 215. The anode of triode 215 is connected through a resistor 216 to a positive potential terminal 217, and the cathode of triode 215 is connected through resistors 218 and 219 to a negative potential terminal 220. The junction between resistors 218 and 219 is connected to ground through a capacitor 221. The anode of triode 215 is connected through a capacitor 223 to the input of gate circuit 213, and the cathode of triode 215 is connected through a capacitor 224 to the input of gate circuit 213'. The output terminal of gate circuit 213 is connected through an isolating resistor 225 to the input of an adder 226. The output terminal of gate circuit 213' is connected through an isolating resistor 227 to the second input of adder 226. The output of adder 226 is connected to the first input of multiplier 100. The second input of multiplier 100 is the output of the corresponding filter 82 of Figure 4.

In the circuit of Figure 6, the output signals from the four filters are summed as in Figure 4. This summed voltage is applied through the threshold device to actuate respective gate circuits. The output signal from the filter corresponding to 87 is divided into two signals which are 180° out of phase with one another. The positive threshold device controls a gate circuit 175a to permit passage of the positive parts of the signal from filter 87 whereas the negative threshold device controls a gate circuit 175a' to permit passage of the negative parts of the signal from filter 87. It should be evident that the net result is substantially the same as that provided by the circuit of Figure 4.

Figure 7:
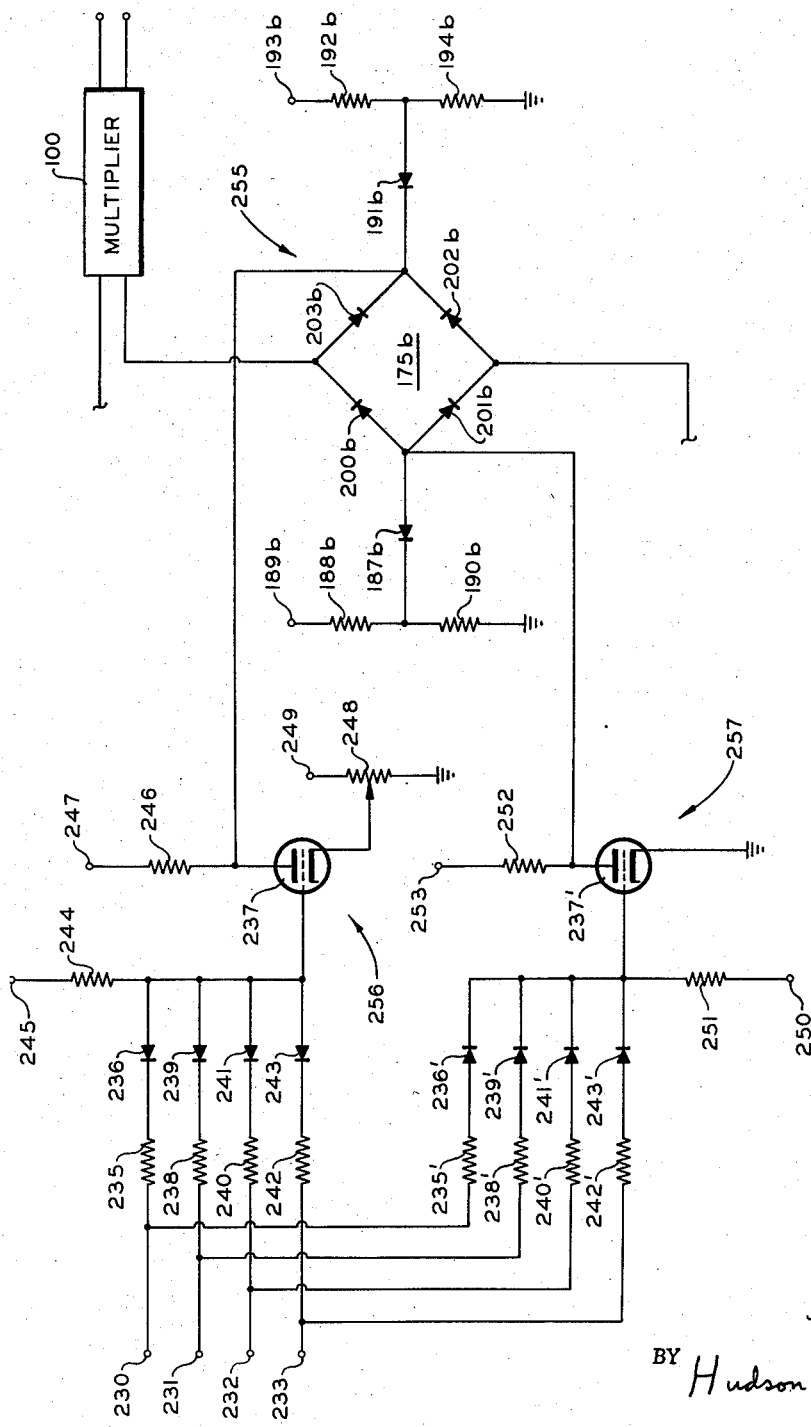
Figure 7 is a schematic circuit drawing of a third embodiment of the coherence measuring apparatus.

A third embodiment of the coherence measuring apparatus of this invention is illustrated in Figure 7. Input terminals 230, 231, 232 and 233 represent the output terminals of the four clippers 83, 85, 88 and 89, respectively, of Figure 4. Terminal 230 is connected through a resistor 235 and a rectifier 236 to the control grid of a triode 237; terminal 231 is connected through a resistor 238 and a rectifier 239 to the control grid of triode 237; terminal 232 is connected through a resistor 240 and a rectifier 241 to the control grid of triode 237; and terminal 233 is connected through a resistor 242 and a rectifier 243 to the control grid of triode 237. The control grid of triode 237 is connected through a resistor 244 to a positive potential terminal 245. The anode of triode 237 is connected through a resistor 246 to a positive potential terminal 247, and the cathode of triode 237 is connected to the contactor of a potentiometer 248. The end terminals of potentiometer 248 are connected to a negative potential terminal 249 and to ground, respectively.

Terminals 230, 231, 232 and 233 are also connected through similar resistors and rectifiers to the control grid of a triode 237'. This second connecting circuit differs from the one previously described in that the polarities of rectifiers 236', 239', 241 and 243' are reversed and the control grid of triode 237 is connected to a negative potential terminal 250 through a resistor 251. The anode of triode 237' is connected through a resistor 252 to a positive potential terminal 253 and the cathode of triode 237' is connected to ground. The anodes of triodes 237 and 237' are connected to respective control terminals of a gate circuit 255.

Triodes 237 and 237' and the circuit elements associated therewith form respective coherence circuits 256 and 257. Triode 237 is biased so that conduction takes place therethrough only when the sum of the signals which appear at the four input terminals exceeds a predetermined value, as indicated by the signals being in phase. Triode 237' is biased so that conduction therethrough is extinguished when the sum of the four input terminals exceeds said predetermined value. Thus, when the input signals are of a common phase and the sum thereof is in excess of a predetermined value, gate circuit 255 is opened to permit passage of a signal from the output of a rectifier corresponding to 101 of Figure 1 to the input of multiplier 100. This signal is multiplied by the output of a filter corresponding to 82 of Figure 1. It should thus be evident that the net result accomplished by the circuit of Figure 7 is also the same as that accomplished by the circuit of Figure 4.

In Figure 8 there is shown a fourth embodiment of the coherence apparatus of this invention. The output signal from filter 82 is applied to the input of a polarity separator 260 which provides output signals corresponding to the positive and the negative portions of the input signal. These two outputs are applied to respective inputs of multipliers 261 and 262. The output signal of filter 87 is applied to a similar polarity separator 263. The two output signals of polarity separator 263 also are applied to respective multipliers 261 and 262. The outputs of multipliers 261 and 262 are applied to the respective inputs of a subtracting circuit 264. The positive portions of the filtered original signals are thus multiplied together and the negative portions of these signals are also multiplied together. The two products are then subtracted to provide a final output signal. It should be evident that this signal is a maximum when the polarities of the two signals being multiplied are substantially the same. The subtracting circuit 264 can be of the same form as the adders previously described except that a phase reversal circuit is included in the output of multiplier 262. This portion of the circuit is substantially identical to the apparatus described in the copending application of R. G. Piety, Serial No. 612,468, filed September 27, 1956. In accordance with the present invention, the output of rectifier 93 is applied to control a gate circuit or a multiplier 265. If a gate circuit is employed, the gate is open only when the output from rectifier 93 exceeds a predetermined value. Thus, the output from circuit 264 is transmitted only when the derivatives of the original signals are of the same polarity. When circuit 265 is a multiplying circuit, the output signal from circuit 264 is multiplied by the output of rectifier 94. The circuit of Figure 8 also provides a measurement of coherence between the original signals.

Figure 9:
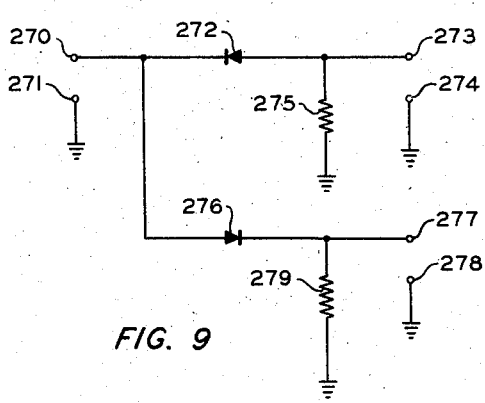
Figure 9 is a schematic circuit drawing of a polarity separator employed in the apparatus of Figure 8.

A suitable polarity separator circuit for use in the apparatus of this invention is shown in Figure 9. The first input terminal 270 is connected to a first output terminal 273 through a rectifier 272 and to a second output terminal 277 through a second rectifier 276. The polarities of rectifiers 272 and 276 are reversed. Second grounded terminals 271, 274 and 278 are associated with respective terminals 270, 273 and 277. Resistors 275 and 279 are connected between respective terminals 273 and 277 and ground. It should be evident that input signals which are positive with respect to ground are transmitted to terminal 277 whereas input signals which are negative with respect to ground are transmitted to terminal 273.

Figure 10A:
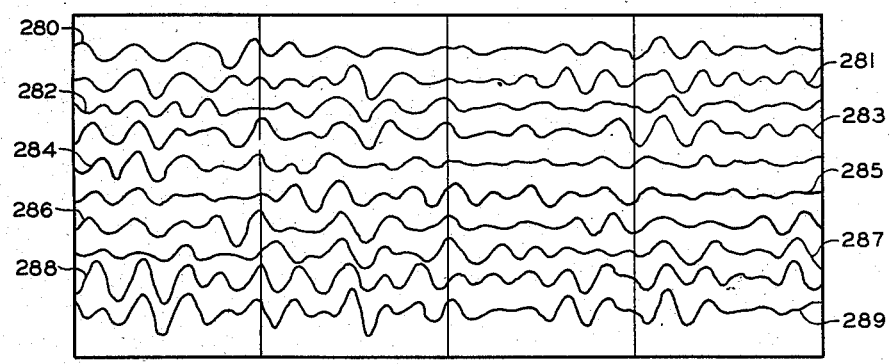
Figures 10a and 10b are graphical representations of original electrical signals and the transformed signals obtained by the method of this invention, respectively.
Figure 10B:
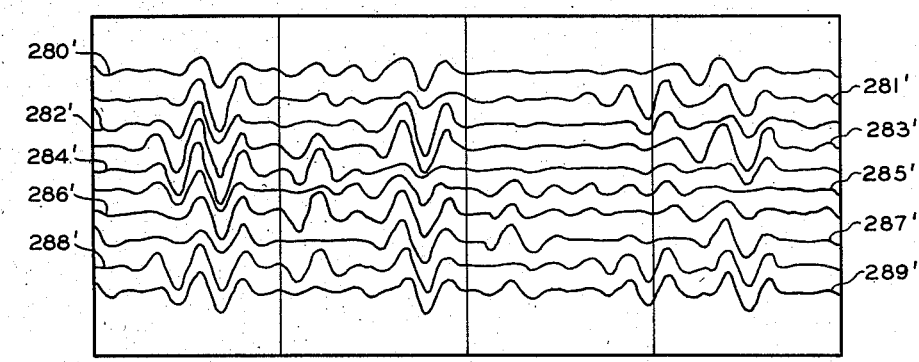

Figures 10a and 10b illustrate the operation of the coherence measuring apparatus of this invention. The curves 280 to 289 of Figure 10a represent seismic signals which have random noise vibrations superimposed thereon. These signals were summed by a magnetic tape recorder and applied as one of the input signals in the apparatus of Figures 4 and 5. Each of the original signals was employed in sequence as the second input signal. Curves 280' to 289' of Figure 10b represent the individual output signals. It should be apparent that common vibration patterns are much more readily identifiable in the curves of Figure 10b.

While the invention has been described in conjunction with present preferred embodiments, it should be evident that it is not limited thereto.

What is claimed is:

1. Seismic signal transforming apparatus comprising means to establish a first electrical signal which varies in amplitude in accordance with vibrations received by a seismometer; means to establish a second electrical signal which varies in amplitude in accordance with vibrations received by a seismometer; means to establish a third electrical signal which is representative of the derivative of said first signal; means to establish a fourth electrical signal which is representative of the derivative of said second signal; means to compare said first, second, third and fourth signals; and means responsive to said means to compare, to combine said first and second signals to establish a fifth signal when the output of said means to compare exceeds a preselected value.

2. Seismic signal transforming apparatus comprising means to establish a first electrical signal which varies in amplitude in accordance with vibrations received by a seismometer; means to establish a second electrical signal which varies in amplitude in accordance with vibrations received by a seismometer; means to establish a third electrical signal which is representative of the derivative of said first signal; means to establsih a fourth electrical signal which is representative of the derivative of said second signal; means to sum said third and fourth signals to establish a fifth electrical signal; means to sum said first and second signals to establish a sixth electrical signal; means to sum said fifth and sixth signals to establish a seventh signal; and means responsive to said seventh signal to combine said first and second signals to establish an eighth signal when said seventh signal exceeds a preselected value.

3. The apparatus of claim 2 wherein said means to combine said first and second signals comprises signal multiplying means, means to apply said first signal to one input of said multiplying means, a gate circuit to apply said second signal to the second input of said multiplying means, and means responsive to said seventh signal to open said gate circuit.

4. The apparatus of claim 2 wherein said means to combine said first and second signals comprises signal multiplying means, means to apply said first signal to one input of said multiplying means, means to establish ninth and tenth electrical signals representative of the positive and negative parts of said second signal, respectively, taken with respect to a reference zero potential, signal summing means having the output thereof applied to the second input of said multiplying means, first and second gate circuits to apply said ninth and tenth signals, respectively, to said summing means, means to open said first gate responsive to the positive part of said seventh signal, taken with respect to said reference potential, and means to open said second gate responsive to the negative part of said seventh signal, taken with respect to said reference potential.

5. Seismic signal transforming apparatus comprising means to establish a first electrical signal which varies in amplitude in accordance with vibrations received by a seismometer; means to establish a second electrical signal which varies in amplitude in accordance with vibrations received by a seismometer; means to establish a third electrical signal which is representative of the derivative of said first signal; means to establish a fourth electrical signal which is representative of the derivative of said second signal; first, second, third and fourth bi-polar clippers to clip said first, second, third and fourth signals, respectively; first adding means to sum the outputs of said first and second clippers; second adding means to sum the outputs of said third and fourth clippers; first and second full wave rectifiers to rectify the outputs of said first and second adding means, respectively; third adding means to sum the outputs of said first and second rectifiers; a multiplier; means applying said first signal to the first input of said multiplier; a gate circuit; means applying said second signal to the input of said gate circuit; means applying the output of said gate circuit to the second input of said multiplier; means to indicate the output of said multiplier; and means responsive to the output of said third adding means to open said gate circuit.

6. Seismic signal transforming apparatus comprising means to establish a first electrical signal which varies in amplitude in accordance with vibrations received by a seismometer; means to establish a second electrical signal which varies in amplitude in accordance with vibrations received by a seismometer; means to establish a third electrical signal which is representative of the derivative of said first signal; means to establish a fourth electrical signal which is representative of the derivative of said second signal; first, second, third and fourth bi-polar clippers to clip said first, second, third and fourth signals, respectively; first adding means to sum the outputs of said first and second clippers; second adding means to sum the outputs of said third and fourth clippers; first and second full wave rectifiers to rectify the outputs of said first and second adding means, respectively; third adding means to sum the outputs of said first and second rectifiers; a multiplier; means applying said first signal to the first input of said multiplier; first and second gate circuits; means to establish fifth and sixth signals representative of the positive and negative parts of said second signal, respectively, taken with respect to a reference zero potential, and to apply same to the inputs of said first and second gate circuits, respectively; fourth adding means to sum the outputs of said first and second gate circuits; means to establish seventh and eighth signals representative of the positive and negative parts of the output signal from said third adding means, respectively, and to apply same to open said first and second gate circuits, respectively; and means to apply the output signal from said fourth adding means to the second input of said multiplier.

7. Seismic signal transforming apparatus comprising means to establish a first electrical signal which varies in amplitude in accordance with vibrations received by a seismometer; means to establish a second electrical signal which varies in amplitude in accordance with vibrations received by a seismometer; means to establish a third electrical signal which is representative of the derivative of said first signal; means to establish a fourth electrical signal which is representative of the derivative of said second signal; first, second, third and fourth bipolar clippers to clip said first, second, third and fourth signals, respectively; a multiplier; means to apply said first signal to the first input of said multiplier; a gate circuit; means to apply said second signal to the input of said gate circuit; means to apply the output of said gate circuit to the second input of said multiplier; and circuit means responsive to the outputs of said first, second, third and fourth clippers to open said gate circuit when the sum of the outputs of said clippers exceeds a predetermined value.

8. The apparatus of claim 7 wherein said circuit means comprises first and second electron tubes each having an anode, a cathode and a control grid; means applying potentials between the anode and cathodes of said tubes so that the anodes are positive with respect to the corresponding cathodes; a first source of potential which is positive with respect to a reference potential; an impedance element connected between said first source of potential and the grid of said first tube; first, second, third and fourth rectifiers connected between the control grid of said first tube and said first, second, third and fourth clippers, respectively, so that current can flow toward said clippers; a second source of potential which is negative with respect to a reference potential; an impedance element connected between said second source of potential and the grid of said second tube; fifth, sixth, seventh and eighth rectifiers connected between the control grid of said second tube and said first, second, third and fourth clippers, respectively, so that current can flow away from said clippers; and means responsive to conduction by said tubes to open said gate circuit.

9. Seismic signal transforming apparatus comprising means to establish a first electrical signal which varies in amplitude in accordance with vibrations received by a seismometer; means to establish a second electrical signal which varies in amplitude in accordance with vibrations received by a seismometer; means to establish a third electrical signal which is representative of the derivative of said first signal; means to establish a fourth electrical signal which is representative of the derivative of said second signal; means to establish fifth and sixth signals which are representative of the positive and negative parts, respectively, of said first signal, taken with respect to a reference zero potential; means to establish seventh and eighth signals which are representative of the positive and negative parts, respectively, of said second signal, taken with respect to said reference potential; means to multiply said fifth and seventh signals to establish a ninth signal; means to multiply said sixth and eighth signals to establish a tenth signal; means to subtract said tenth signal from said ninth signal to establish an eleventh signal; signal indicating means; means to sum said third and fourth signals; and means responsive to said means to sum to apply said eleventh signal to said indicating means when the sum of said third and fourth signals exceeds a predetermined value.

10. Seismic signal transforming apparatus comprising means to establish a first electrical signal which varies in amplitude in accordance with vibrations received by a seismometer; means to establish a second electrical signal which varies in amplitude in accordance with vibrations received by a seismometer; means to establish a third electrical signal which is representative of the derivative of said first signal; means to establish a fourth electrical signal which is representative of the derivative of said second signal; means to establish fifth and sixth signals which are representative of the positive and negative parts, respectively, of said first signal, taken with respect to a reference zero potential; means to establish seventh and eighth signals which are representative of the positive and negative parts, respectively, of said second signal, taken with respect to said reference potential; means to multiply said fifth and seventh signals to establish a ninth signal; means to multiply said sixth and eighth signals to establish a tenth signal; means to subtract said tenth signal from said ninth signal to establish an eleventh signal; a multiplier; means to apply said eleventh signal to the first input of said multiplier; and means to sum said third and fourth signals and to apply the sum to the second input of said multiplier.

11. Apparatus for measuring coherence between first and second electrical signals comprising means responsive to the first signal to establish a third electrical signal which is representative of the derivative of the first signal; means responsive to the second signal to establish a fourth electrical signal which is representative of the derivative of the second signal; means to compare the first, second, third and fourth signals; and means responsive to said means to compare to combine the first and second signals when the output of said means to compare exceeds a preselected value.

12. Apparatus for measuring coherence between first and second electrical signals comprising means responsive to the first signal to establish a third electrical signal which is representative of the derivative of the first signal; means responsive to the second signal to establish a fourth electrical signal which is representative of the derivative of the second signal; means to sum the third and fourth signals to establish a fifth electrical signal; means to sum the first and second signals to establish a sixth electrical signal; means to sum the fifth and sixth signals to establish a seventh electrical signal; and means responsive to the seventh signal to combine the first and second signals to establish an eighth signal when the seventh signal exceeds a preselected value.

13. Apparatus for measuring coherence between first and second electrical signals comprising means responsive to the first signal to establish a third electrical signal which is representative of the derivative of the first signal; means responsive to the second signal to establish a fourth electrical signal which is representative of the derivative of the second signal; means to establish fifth and sixth electrical signals which are representative of the positive and negative parts, respectively, of the first signal, taken with respect to a reference zero potential; means to establish seventh and eighth signals which are representative of the positive and negative parts, respectively, of the second signal, taken with respect to said reference potential; means to multiply the fifth and seventh signals to establish a ninth electrical signal; means to multiply the sixth and eighth signals to establish a tenth electrical signal; means to subtract the tenth signal from the ninth signal to establish an eleventh electrical signal; signal indicating means; means to sum the third and fourth signals; and means responsive to said means to sum to apply the eleventh signal to said indicating means when the sum of the third and fourth signals exceeds a predetermined value.

14. Apparatus for measuring coherence between first and second electrical signals comprising means responsive to the first signal to establish a third electrical signal which is representative of the derivative of the first signal; means responsive to the second signal to establish a fourth electrical signal which is representative of the derivative of the second signal; means to establish fifth and sixth electrical signals which are representative of the positive and negative parts, respectively, of the first signal, taken with respect to a reference zero potential; means to establish seventh and eighth signals which are representative of the positive and negative parts, respectively, of the second signal, taken with respect to said reference potential; means to multiply the fifth and seventh signals to establish a ninth electrical signal; means to multiply the sixth and eighth signals to establish a tenth electrical signal; means to subtract the tenth signal from the ninth signal to establish an eleventh electrical signal; a multiplier, means to apply the eleventh signal to the first input of said multiplier; and means to sum the third and fourth signals and to apply the sum to the second input of said multiplier.

No references cited.